(12) United States Patent
Chen et al.

(10) Patent No.: US 11,176,276 B1
(45) Date of Patent: Nov. 16, 2021

(54) SYSTEMS AND METHODS FOR MANAGING ENDPOINT SECURITY STATES USING PASSIVE DATA INTEGRITY ATTESTATIONS

(71) Applicant: CA, Inc., San Jose, CA (US)

(72) Inventors: Joseph Chen, Culver City, CA (US); Qubo Song, Culver City, CA (US); Spencer Smith, El Segundo, CA (US); Shaun Aimoto, Calgary (CA); Haik Mesropian, Glendale, CA (US); David Kane, Los Angeles, CA (US); Peter Ferrie, Los Angeles, CA (US); Jordan Saxonberg, Los Angeles, CA (US); Costin Ionescu, Redondo Beach, CA (US)

(73) Assignee: CA, INC., San Jose, CA (US)

( * ) Notice: Subject to any disclaimer, the term of this patent is extended or adjusted under 35 U.S.C. 154(b) by 293 days.

(21) Appl. No.: 16/420,016

(22) Filed: May 22, 2019

(51) Int. Cl.
*H04L 29/06* (2006.01)
*G06F 21/64* (2013.01)

(52) U.S. Cl.
CPC ............ *G06F 21/64* (2013.01); *H04L 63/105* (2013.01); *H04L 63/1425* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 9,917,852 | B1* | 3/2018 | Xu | H04L 63/1483 |
| 2014/0096187 | A1* | 4/2014 | Shang | G06F 21/56 726/1 |
| 2014/0137191 | A1* | 5/2014 | Goldsmith | G06F 21/316 726/3 |
| 2018/0013771 | A1* | 1/2018 | Crabtree | H04L 63/1433 |
| 2020/0272760 | A1* | 8/2020 | Kurian | G06F 21/31 |
| 2020/0280572 | A1* | 9/2020 | Xu | H04L 63/1483 |

* cited by examiner

*Primary Examiner* — Joseph P Hirl
*Assistant Examiner* — Hassan Saadoun
(74) *Attorney, Agent, or Firm* — Foley & Lardner LLP

(57) ABSTRACT

The disclosed computer-implemented method for managing endpoint security states using passive data integrity attestations may include (i) receiving passively collected network data from an endpoint device of a computing environment, (ii) determining a security state of the endpoint device using the passively collected network data from the endpoint device, (iii) determining that the security state of the endpoint device is below a threshold, and (iv) in response to determining that the security state of the endpoint device is below a threshold, performing a security action to protect the computing environment against malicious actions. Various other methods, systems, and computer-readable media are also disclosed.

20 Claims, 6 Drawing Sheets

SYSTEMS AND METHODS FOR MANAGING ENDPOINT SECURITY STATES USING PASSIVE DATA INTEGRITY ATTESTATIONS

BACKGROUND

Traditional security models for managing computing systems typically allow devices that are connected to a local network to access resources. In some cases, systems may use authentication credentials or local certificates as a form of verification to obtain trust and gain access to the resources of the system. While such systems may make it difficult for an attacker to gain access from outside the local network, upon infiltration of the system, the attacker may have free reign inside the system. A zero-trust security system, in contrast, utilizes attestation technologies for all users and devices attempting to access resources on a private network, regardless of their location within or outside of a network perimeter. Unfortunately, conventional attestation technologies may collect information at the time of authentication, which may not reflect the entire state of trustworthiness of an endpoint device in a session of extended duration. The present disclosure, therefore, identifies and addresses a need for systems and methods for managing endpoint security states using passive data integrity attestations.

SUMMARY

As will be described in greater detail below, the present disclosure describes various systems and methods for managing endpoint security states using passive data integrity attestations.

In one example, a method for managing endpoint security states using passive data integrity attestations may include (i) receiving passively collected network data from an endpoint device of a computing environment, (ii) determining a security state of the endpoint device using the passively collected network data from the endpoint device, (iii) determining that the security state of the endpoint device is below a threshold, and (iv) in response to determining that the security state of the endpoint device is below a threshold, performing a security action to protect the computing environment against malicious actions.

In some examples, the security action may include updating the endpoint device to a reduced trust level and displaying a notification to a user of the endpoint device with the reduced trust level. The method may include authorizing access to resources associated with the reduced trust level or blocking access to resources of the computing environment. A reduced trust level may be associated with the user of the endpoint device and the method may further include identifying computing devices associated with the user and associating the reduced trust level with the computing devices of the user.

In some examples, the passively collected network data from the endpoint device may include an encryption level of a network connection, an indication that personally identifying information has been transmitted in plaintext, and/or metadata associated with a network connection of the endpoint device. The passively collected network data from the endpoint device may be collected in a user session of the endpoint device. The passively collected network data from the endpoint device may be collected using a network filter.

In one example, a system for managing endpoint security states using passive data integrity attestations may include at least one physical processor and physical memory that includes computer-executable instructions that, when executed by the physical processor, cause the physical processor to (i) receive passively collected network data from an endpoint device of a computing environment, (ii) determine a security state of the endpoint device using the passively collected network data from the endpoint device, (iii) determine that the security state of the endpoint device is below a threshold, and (iv) in response to determining that the security state of the endpoint device is below a threshold, perform a security action to protect the computing environment against malicious actions.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive passively collected network data from an endpoint device of a computing environment, (ii) determine a security state of the endpoint device using the passively collected network data from the endpoint device, (iii) determine that the security state of the endpoint device is below a threshold, and (iv) in response to determining that the security state of the endpoint device is below a threshold, perform a security action to protect the computing environment against malicious actions.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
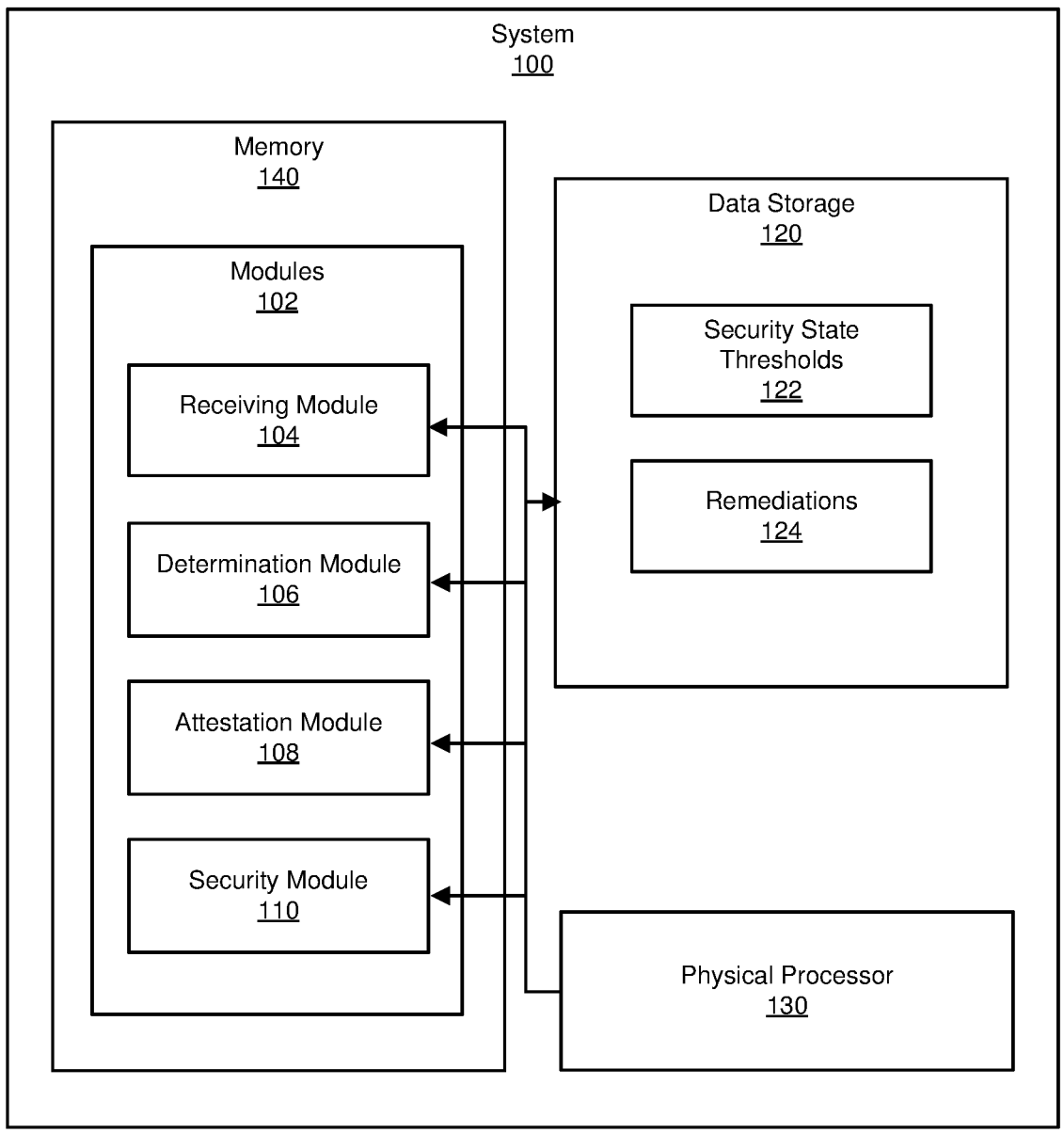
FIG. 1 is a block diagram of an example system for managing endpoint security states using passive data integrity attestations.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for managing endpoint security states using passive data integrity attestations. As will be described in greater detail below, the systems and methods described herein may monitor traffic of an endpoint device through one or more pipes and passively collect data. The data may be collected for pipe integrity attestation, which may represent a more accurate state of trustworthiness of the endpoint device during an extended session.

In some examples, the system may collect data passively from an endpoint device. Collecting data passively may include monitoring data transmitted through the network pipe without actively requesting an action from the system or endpoint device. Examples of data that may be passively collected may include, but are not limited to, the occurrence of plaintext passwords, identification of a cipher suite (e.g., cryptographic algorithms) used to negotiate a secure socket layer (SSL) or transport layer security (TLS) connection, and the like. The passively collected data may be submitted to an attestation server of a zero-trust system. The attestation server may determine the security state of the endpoint device based on the passively collected data and determine a level of trust to assign to the endpoint device in the zero-trust security system.

Conventional attestation technologies may actively request information from a user to authenticate the user to the system. For example, a user may be requested to provide a username and password. The user may then be requested to answer a security challenge (e.g., image identification, security questions, etc.). However, the data collected at the time of the authentication may not accurately reflect the state of trustworthiness of the endpoint device in a session of extended duration. For example, while a user may provide the necessary credentials to gain access to the zero-trust system at the time of authentication, the endpoint device may have vulnerabilities in applications or security practices that are not related to the zero-trust system. If an attacker gains control of the endpoint device by exploiting such vulnerabilities, the attacker may be able to gain access to the resources of the system, potentially with catastrophic results.

Figure 2:
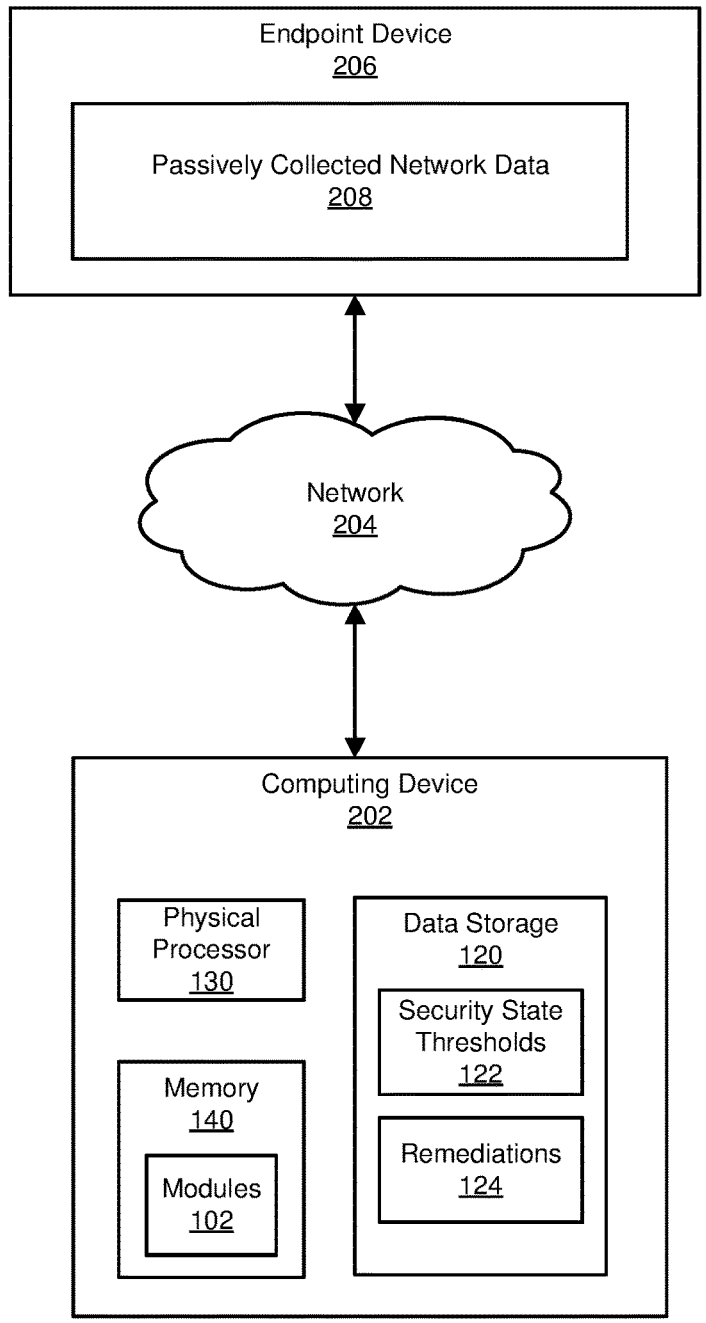
FIG. 2 is a block diagram of an additional example system for managing endpoint security states using passive data integrity attestations.

The following will provide, with reference to FIGS. 1-2, detailed descriptions of example systems for managing endpoint security states using passive data integrity attestations. Detailed descriptions of corresponding computer-implemented methods will also be provided in connection with FIG. 3. A detailed description of data flow through the example system for managing endpoint security states using passive data integrity attestations will also be provided in connection with FIG. 4. In addition, detailed descriptions of an example computing system and network architecture capable of implementing one or more of the embodiments described herein will be provided in connection with FIGS. 5 and 6, respectively.

FIG. 1 is a block diagram of an example system 100 for managing endpoint security states using passive data integrity attestations. As illustrated in this figure, the example system 100 may include one or more modules 102 for performing one or more tasks. As will be explained in greater detail below, modules 102 may include a receiving module 104, a determination module 106, an attestation module 108, and a security module 110. Although illustrated as separate elements, one or more of the modules 102 in FIG. 1 may represent portions of a single module or application.

In certain embodiments, one or more of the modules 102 in FIG. 1 may represent one or more software applications or programs that, when executed by a computing device, may cause the computing device to perform one or more tasks. For example, and as will be described in greater detail below, one or more of the modules 102 may represent modules stored and configured to run on one or more computing devices, such as the devices illustrated in FIG. 2 (e.g., computing device 202 and/or endpoint device 206). One or more of the modules 102 in FIG. 1 may also represent all or portions of one or more special-purpose computers configured to perform one or more tasks.

As illustrated in FIG. 1, the example system 100 may also include one or more memory devices, such as the memory 140. The memory 140 generally represents any type or form of volatile or non-volatile storage device or medium capable of storing data and/or computer-readable instructions. In one example, the memory 140 may store, load, and/or maintain one or more of the modules 102. Examples of the memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, the example system 100 may also include one or more physical processors, such as the physical processor 130. The physical processor 130 generally represents any type or form of hardware-implemented processing unit capable of interpreting and/or executing computer-readable instructions. In one example, the physical processor 130 may access and/or modify one or more of the modules 102 stored in the memory 140. Additionally, or alternatively, the physical processor 130 may execute one or more of the modules 102 to facilitate managing endpoint security states using passive data integrity attestations. Examples of the physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, the example system 100 may also include data storage 120. The data storage 120 generally represents any type or form of computing device capable of data storage. In one example, the data storage 120 may store security state thresholds 122 and/or remediations 124.

The example system 100 in FIG. 1 may be implemented in a variety of ways. For example, all or a portion of the example system 100 may represent portions of the example system 200 in FIG. 2. As shown in FIG. 2, the system 200 may include a computing device 202 in communication with an endpoint device 206 via a network 204. In one example, all or a portion of the functionality of the modules 102 may be performed by the computing device 202, the endpoint device 206, and/or any other suitable computing system. As will be described in greater detail below, one or more of the modules 102 from FIG. 1 may, when executed by at least one processor of the computing device 202 and/or the endpoint device 206, enable the computing device 202 and/or the endpoint device 206 to manage endpoint security states using passive data integrity attestations. For example, and as will be described in greater detail below, one or more of the modules 102 may cause the computing device 202 and/or the endpoint device 206 to receive passively collected network data from an endpoint device, determine a security state of the endpoint device based on the network data, determine that the security state of the endpoint device is below a threshold, and in response to determining the security state of the endpoint device is below the threshold, perform a security action to protect against malicious actions.

The computing device 202 generally represents any type or form of computing device capable of reading computer-executable instructions. For example, the computing device 202 may include a server running server-side security software capable of receiving passively collected network data from an endpoint device, such as endpoint device 206, and protecting the computing environment against malicious actions based on security state of the endpoint device 206. Additional examples of the computing device 202 include, without limitation, security servers, application servers, web servers, storage servers, and/or database servers configured to run certain software applications and/or provide various security, web, storage, and/or database services. Although illustrated as a single entity in FIG. 2, the computing device 202 may include and/or represent a plurality of servers that work and/or operate in conjunction with one another.

The endpoint device 206 generally represents any type or form of computing device capable of reading computer-executable instructions. For example, the endpoint device 206 may include a computing device (e.g., a mobile computing device) running client-side security software that transmits passively collected network data 208. Additional examples of the endpoint device 206 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

The network 204 generally represents any medium or architecture capable of facilitating communication or data transfer. In one example, the network 204 may facilitate communication between the computing device 202 and/or the endpoint device 206. In this example, the network 204 may facilitate communication or data transfer using wireless and/or wired connections. Examples of the network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
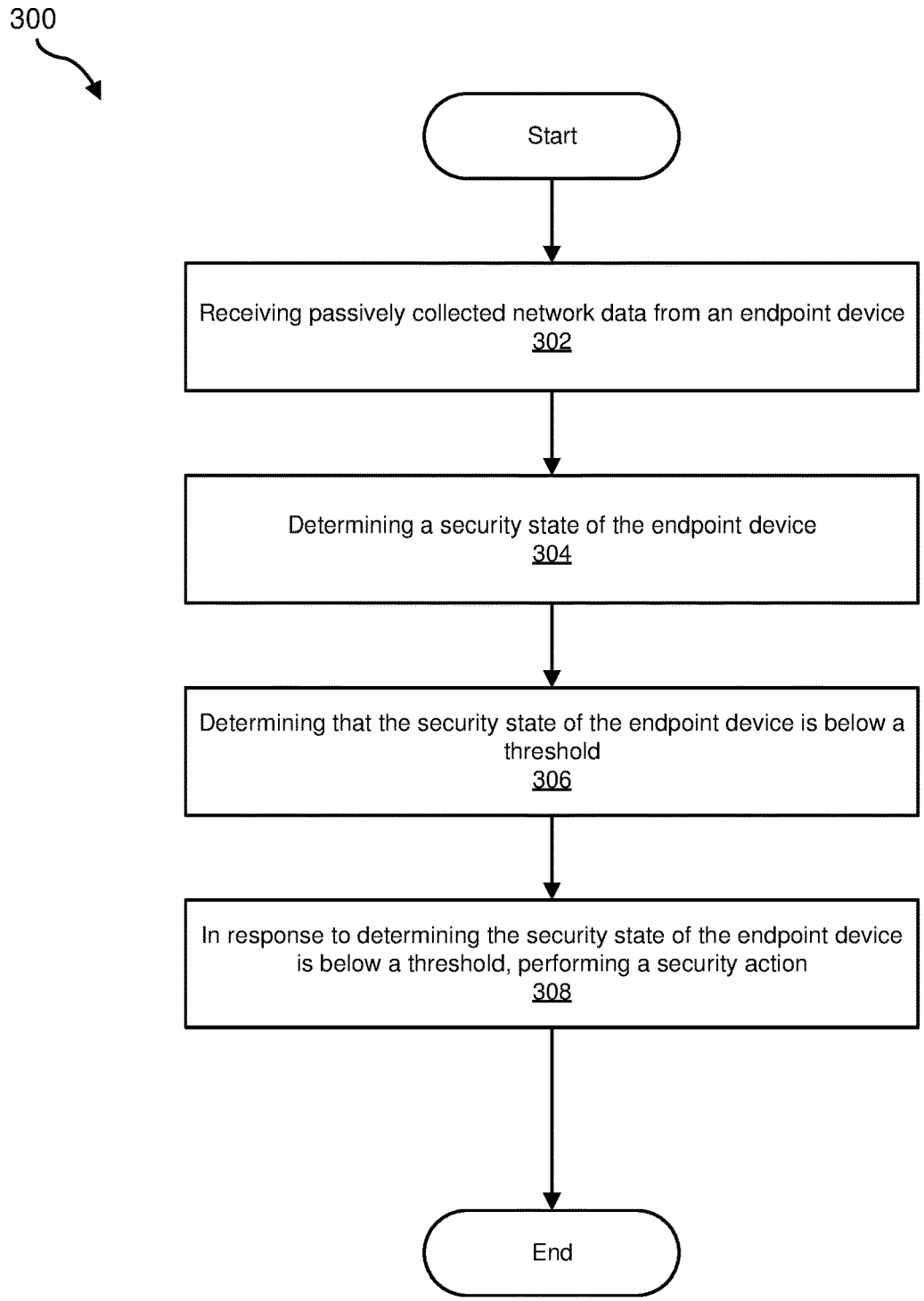
FIG. 3 is a flow diagram of an example method for managing endpoint security states using passive data integrity attestations.
Figure 4:
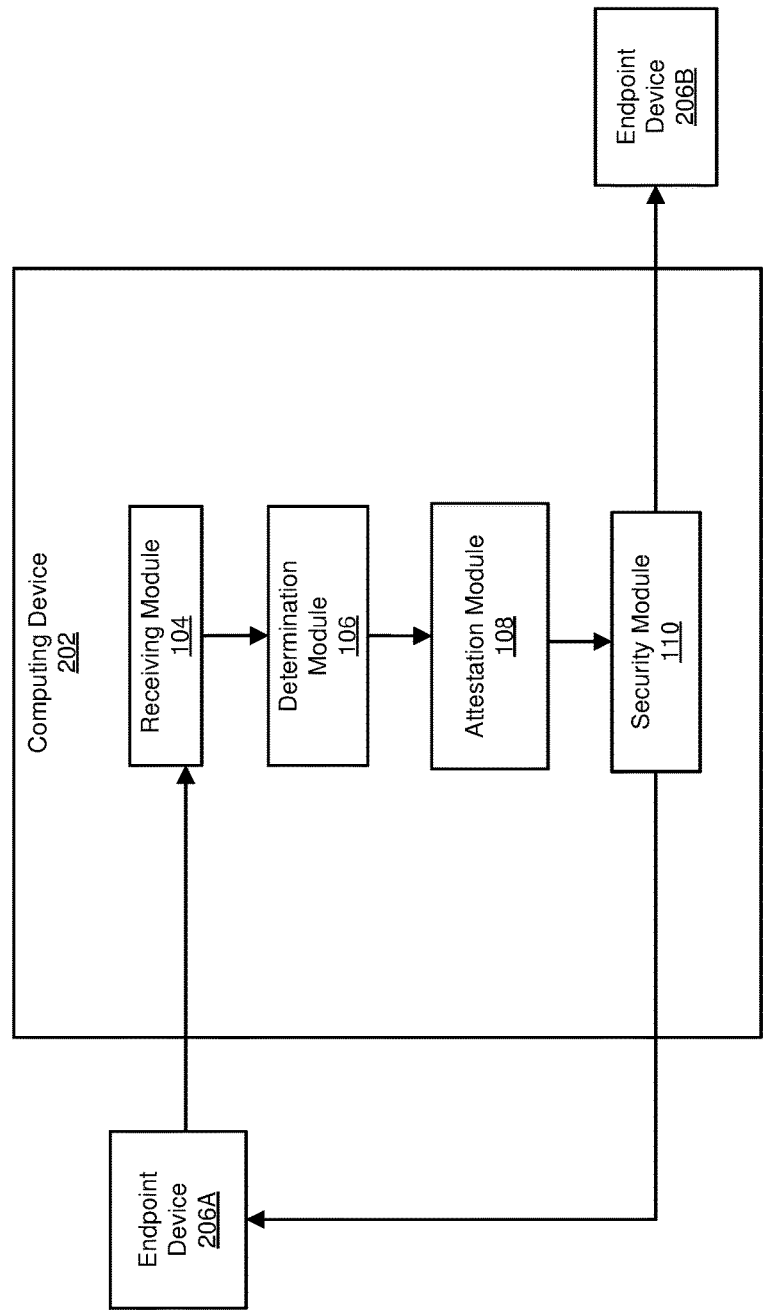
FIG. 4 is a data flow diagram of an example system for managing endpoint security states using passive data integrity attestations.

FIG. 3 is a flow diagram of an example computer-implemented method 300 for managing endpoint security states using passive data integrity attestations. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive passively collected network data from an endpoint device. The system may receive passively collected network data in any suitable manner. For example, the receiving module 104 may, as part of computing device 202 in FIG. 2, receive passively collected data, such as passively collected network data 208, from an endpoint device, such as endpoint device 206.

The term "passively collected network data," as used herein, generally refers to data collected from an endpoint device or system without actively requesting anything from the system or endpoint device. This data may be monitored as it is being transmitted to and from the endpoint device. In some examples, the data may be monitored by a network filter of the endpoint device. Passively collectedly network data may be data that is collected on the device for a specified period of time or within an active user session. In some examples, the passively collected data may be data that has been collected for a recent period of time on a mobile device where a user logon or logoff event is not available. Examples of the passively collected network data 208 may include, but are not limited to, an encryption level of a network connection, an indication that personally identifying information has been transmitted to and/or from the endpoint device 206 in plaintext, metadata associated with a network connection of the endpoint device 206, and the like.

In some examples, data may be monitored and collected from the endpoint device 206 in response to a login event. For example, a user may provide credentials to the endpoint device 206 to be granted access to the zero-trust system. In response to being granted access to the zero-trust system, the endpoint device 206 may begin monitoring and collecting data transmitted to and/or from the endpoint device 206. In some examples, one or more network filters of the endpoint device 206 may be used to monitor data transmissions. The network filters may monitor the data being transmitted and collect and/or generate data. The endpoint device 206 may also establish a secure connection with the computing device 202 and transmit the passively collected network data 208 to the computing device 202 over the secure connection.

In some examples, the endpoint device 206 may aggregate the passively collected network data 208 and transmit the data to the attestation server (e.g., computing device 202) upon termination of the user session (e.g., in response to a logoff event) and/or may transmit the passively collected network data 208 in real-time or near real-time. In addition, the passively collected network data 208 may be transmitted to the computing device 202 in real-time if the endpoint device 206 detects an event (e.g., connection to an unapproved system, etc.). The computing device 202 may then adjust the level of trust associated with the endpoint device 206 and take security actions immediately to minimize any potential damage from the identified event.

At step 304, one or more of the systems described herein may determine a security state of the endpoint device. The system may perform this step in any suitable manner. For example, the determination module 106 may, as part of computing device 202 in FIG. 2, receive the passively collected network data 208 from the endpoint device 206 and determine a security state of the endpoint device 206.

The term "security state," as used herein, generally refers to a current level of security that is active and valid on a computing device, such as endpoint device 206. In some examples, the security state may be a numeric value indicative of a strength of protection of the endpoint device. In some examples, a higher numeric value may indicate a valid and active protection state while a lower numeric value may indicate a security protection state that is vulnerable to malicious attacks and malware.

In some examples, the security state may be determined based on the passively collected network data 208 from the endpoint device. For example, the determination module 106 of the computing device may process the passively collected network data 208 and identify the number of security vulnerabilities detected in the passively collected network data 208. In some examples, the determination module 106 may determine that the security state of the endpoint is high if there is a low number of security vulnerabilities detected in the passively collected network data 208. In some examples, the determination module 106 may determine that the security state of the endpoint device 206 is low if the number of security vulnerabilities detected in the passively collected network data 208 is high.

In some examples, the determination module 106 may analyze the passively collected network data 208. For example, the determination module 106 may detect the occurrence of plaintext passwords and/or other sensitive information in the passively collected network data 208. Examples of sensitive information may include personally identifying information (e.g., social security numbers, contact information, etc.), financial information (e.g., credit card numbers, bank account numbers, financial statements, etc.), etc. In some examples, the passively collected network data 208 may include data generated by the endpoint device 206 indicating that sensitive information is being transmitted in plaintext to and/or from the endpoint device 206. The passively collected network data 208 may include data indicating the occurrence of the transmission of plaintext passwords or other sensitive data, the application or component transmitting the data, the time and date of the transmission of data, the type of connection used to transmit the data, and the like. In some examples, the passively collected network data 208 may not include the passwords and/or other sensitive data to reduce the likelihood that such sensitive data could be leaked.

In some examples, the determination module 106 may analyze the passively collected network data 208 and identify one or more cipher suites used by the applications or components of the endpoint device 206 to negotiate network connections, such as SSL or TLS connections. The passively collected network data 208 may include data that identifies the weakest cipher suite used by the endpoint device 206. The weakest cipher suite may indicate the lowest level of encryption of the endpoint device 206, which may be exploited by an attacker in an effort to gain control of the endpoint device 206. The determination module 106 may compare the identified cipher suite and determine whether the strength of the cipher suite meets an identified security threshold. If the cipher suite does not meet the identified threshold, the determination module 106 may decrease the security state associated with the endpoint device 206.

In some examples, the determination module 106 may analyze the passively collected data 208 and detect data associated with a trace route from the endpoint device 206 to any target resource. A trace route may be a diagnostic command that displays the path to an identified resource and measures transit delays of data packets across a network. The trace route data may indicate information about each hop of the path to the resource. For example, the trace route data may include an IP address of a device in the path to the resource. The determination module 106 may use the IP address to request reputation data associated the device associated with the IP address. If the reputation data indicates that the device associated with the IP address is malicious or potentially harmful, the determination module 106 may decrease the security state associated with the endpoint device 206. In some examples, determination module 106 may detect additional information, such as connections from the endpoint device 206 to unapproved systems (e.g., systems identified and blocked by the zero-trust security system, systems with identified low security systems, etc.) or use of the same password in other systems as the zero-trust system, and the like. The use of the same password in other systems and the zero-trust system may be detected obtaining a hash, generated by systems of the endpoint device 206, of any passwords detected on the endpoint device 206 from passively collected network data 208. The determination module 106 may compare the hash of the detected password from the endpoint device 206 with a hash of the password used by the endpoint device 206 to authenticate to the zero-trust security system. If the hash of the password from the endpoint device 206 and the password used by the endpoint device 206 to authenticate to the zero-trust security system are the same or sufficiently similar, then the determination module 106 may decrease the security state associated with the endpoint device 206.

The determination module 106 may assign different weights to the different types of data detected in the passively collected network data 208 to determine a security state for the endpoint device 206. For example, cipher suite protection may be a higher priority than transmission of passwords or other information in plaintext. The determination module 106 may give a higher weight to cipher suite protection of the endpoint device 206

At step 306, one or more of the systems described herein may determine that the security state of the endpoint device is below a threshold. The system may perform this step in any suitable manner. For example, the attestation module 108 may, as part of computing device 202 in FIG. 2, determine that the security state of the endpoint device is below a threshold, such as security state threshold 122. In some examples, the security state threshold 122 may be set by an administrator. In some examples, the security state threshold 122 may be adjusted based on historic data associated with the endpoint device 206 or other endpoint devices 206 in a computing environment. In some examples, the security state threshold 122 may be different for different types or models of endpoint devices (e.g., mobile device, laptops, tablets, wearable devices, etc.)

In some examples, the security state threshold 122 may be adjusted based on a previous security state of the endpoint device 206. For example, if the previous security state of the endpoint device 206 was below the security state threshold 122 by an identified level or percentage, the security state threshold 122 may be decreased by an identified value. Similarly, if the previous security state of the endpoint device 206 was above the security state threshold 122 by an identified level or percentage, the security state threshold 122 may be increased by an identified value.

At step 308, one or more of the systems described herein may, in response to determining the security state of the endpoint device is below a threshold, perform a security action. The system may perform this step in any suitable manner. For example, the determination module 106 may, as part of computing device 202 in FIG. 2, receive the passively collected network data 208 from the endpoint device 206 and determine a security state of the endpoint device 206.

In response to the determination module 106 determining that the security state of the endpoint device 206 is below a security state threshold 122, the security module 110 may perform the security action. In some examples, the security module 110 may execute one or more remediations 124. For example, the security module 110 update the endpoint device 206 to a reduced trust level and display a notification to a user of the endpoint device with the reduced trust level. The security module 110 may authorize access to resources associated with the reduced trust level or block access to resources of the computing environment. In some examples, a reduced trust level may be associated with the user of the endpoint device 206. Based on the reduced trust level associated with the user of the endpoint device 206, the security module may identify computing devices associated with the user and associate the reduced trust level with the computing devices of the user.

The example system 100 in FIG. 1 may be implemented in a variety of ways. For example, all or a portion of the example system 100 may represent portions of the system 400 in FIG. 4. As will be described in greater detail below, one or more of the modules 102 from FIG. 1 may, when executed by at least one processor of the computing device 202, enable the system 100 to protect the computing environment based on the security state of endpoint devices, such as 206A and 206B. For example, and as will be described in greater detail herein, one or more of the modules 102 may cause the computing device 202 to receive, by the receiving module 104, passively collected network data 208 from an endpoint device, such as endpoint device 206A. The passively collected network data 208 may include data collected from a network pipe of the endpoint device 206. The determination module 106 may determine a security state of the endpoint device 206A based on the passively collected network data 208 received from the endpoint device 206A. The attestation module 108 may determine that the security state of the endpoint device 206A is below a threshold. In response to determining that the security state of the endpoint device 206A is below a threshold, the security module 110 may perform a security action. In some examples, the security action may include update the trust level associated with the endpoint device 206A to a lower level of trust. The security module 110 may identify a user associated with the endpoint device 206A and may lower the level of trust for all devices associated with the user, such as endpoint device 206B.

The systems and methods described herein are generally directed to managing security states of endpoints to protect a computing environment against malicious actions using passive data integrity attestations. The system may monitor and passively collect data from an endpoint device of a zero-trust security system and transmit the data to an attestation server. Based on the data received from the endpoint device, the system may determine whether the endpoint device is secure and may determine a level of trust to assign to the endpoint device in the zero-trust security system. By doing so, the systems and methods described herein may be used to guard against low security levels of an endpoint device that may leave the endpoint device vulnerable to exploitation by an attacker and/or malware.

Figure 5:
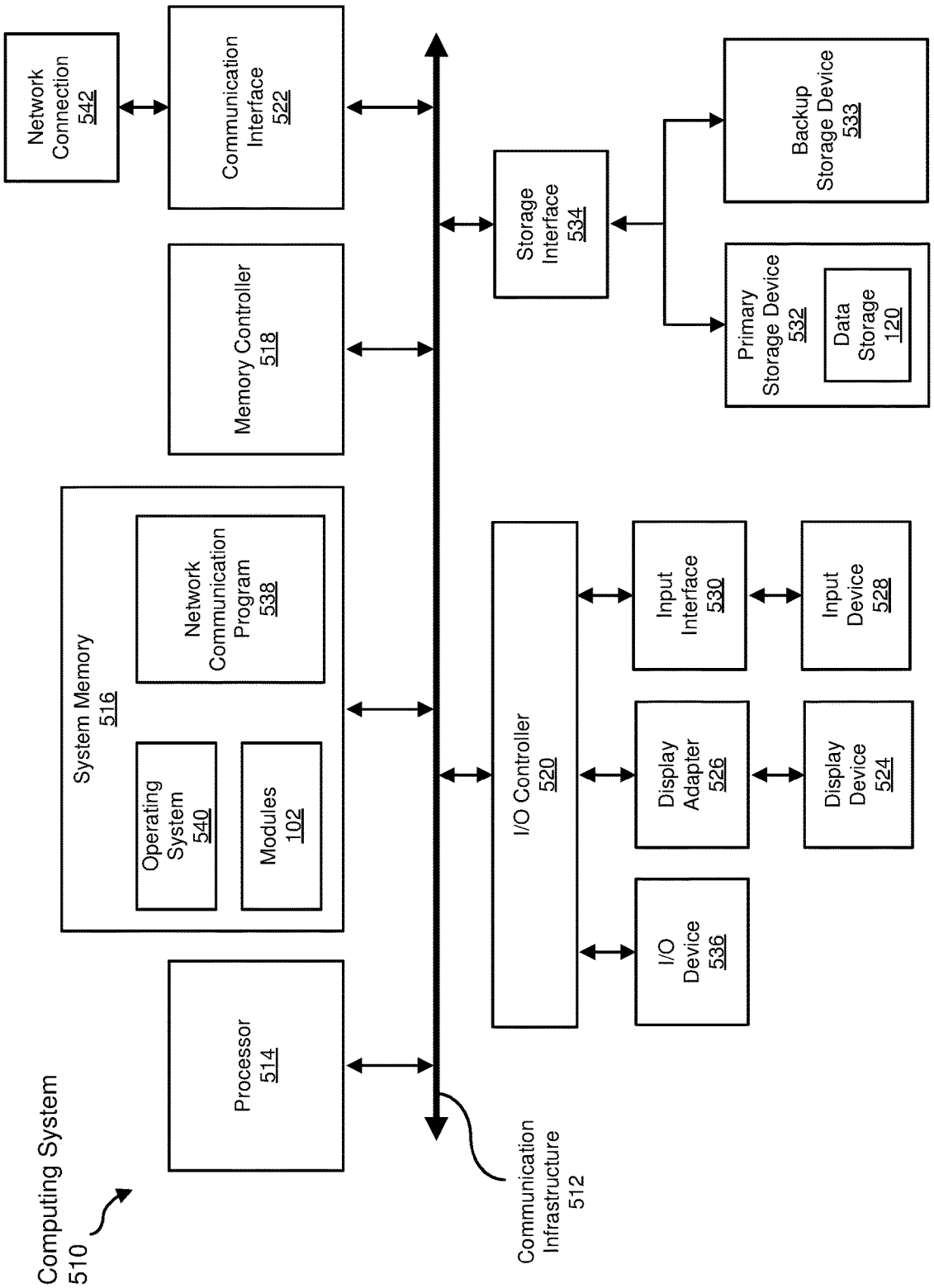
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of the computing system 510 may perform and/or be a means for performing, either alone or in combination with other elements, one or more of the steps described herein (such as one or more of the steps illustrated in FIG. 3). All or a portion of the computing system 510 may also perform and/or be a means for performing any other steps, methods, or processes described and/or illustrated herein.

The computing system 510 broadly represents any single or multi-processor computing device or system capable of executing computer-readable instructions. Examples of the computing system 510 include, without limitation, workstations, laptops, client-side terminals, servers, distributed computing systems, handheld devices, or any other computing system or device. In its most basic configuration, the computing system 510 may include at least one processor 514 and a system memory 516.

The processor 514 generally represents any type or form of physical processing unit (e.g., a hardware-implemented central processing unit) capable of processing data or interpreting and executing instructions. In certain embodiments, the processor 514 may receive instructions from a software application or module. These instructions may cause the processor 514 to perform the functions of one or more of the example embodiments described and/or illustrated herein.

The system memory 516 generally represents any type or form of volatile or non-volatile storage device or medium capable of storing data and/or other computer-readable instructions. Examples of the system memory 516 include, without limitation, Random Access Memory (RAM), Read Only Memory (ROM), flash memory, or any other suitable memory device. Although not required, in certain embodiments the computing system 510 may include both a volatile memory unit (such as, for example, the system memory 516) and a non-volatile storage device (such as, for example, the primary storage device 532, as described in detail below). In one example, one or more of the modules 102 from FIG. 1 may be loaded into the system memory 516.

In some examples, the system memory 516 may store and/or load an operating system 540 for execution by the processor 514. In one example, the operating system 540 may include and/or represent software that manages computer hardware and software resources and/or provides common services to computer programs and/or applications on the computing system 510. Examples of the operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, the example computing system 510 may also include one or more components or elements in addition to the processor 514 and the system memory 516. For example, as illustrated in FIG. 5, the computing system 510 may include a memory controller 518, an Input/Output (I/O) controller 520, and a communication interface 522, each of which may be interconnected via a communication infrastructure 512. The communication infrastructure 512 generally represents any type or form of infrastructure capable of facilitating communication between one or more components of a computing device. Examples of the communication infrastructure 512 include, without limitation, a communication bus (such as an Industry Standard Architecture (ISA), Peripheral Component Interconnect (PCI), PCI Express (PCIe), or similar bus) and a network.

The memory controller 518 generally represents any type or form of device capable of handling memory or data or controlling communication between one or more components of the computing system 510. For example, in certain embodiments, the memory controller 518 may control communication between the processor 514, the system memory 516, and the I/O controller 520 via the communication infrastructure 512.

The I/O controller 520 generally represents any type or form of module capable of coordinating and/or controlling the input and output functions of a computing device. For example, in certain embodiments, the I/O controller 520 may control or facilitate transfer of data between one or more elements of the computing system 510, such as the processor 514, the system memory 516, the communication interface 522, the display adapter 526, the input interface 530, and the storage interface 534.

As illustrated in FIG. 5, the computing system 510 may also include at least one display device 524 coupled to the I/O controller 520 via a display adapter 526. The display device 524 generally represents any type or form of device capable of visually displaying information forwarded by the display adapter 526. Similarly, the display adapter 526 generally represents any type or form of device configured to forward graphics, text, and other data from the communication infrastructure 512 (or from a frame buffer, as known in the art) for display on the display device 524.

As illustrated in FIG. 5, the example computing system 510 may also include at least one input device 528 coupled to the I/O controller 520 via an input interface 530. The input device 528 generally represents any type or form of input device capable of providing input, either computer or human generated, to the example computing system 510. Examples of the input device 528 include, without limitation, a keyboard, a pointing device, a speech recognition device, variations or combinations of one or more of the same, and/or any other input device.

Additionally, or alternatively, the example computing system 510 may include additional I/O devices. For example, the example computing system 510 may include the I/O device 536. In this example, the I/O device 536 may include and/or represent a user interface that facilitates human interaction with the computing system 510. Examples of the I/O device 536 include, without limitation, a computer mouse, a keyboard, a monitor, a printer, a modem, a camera, a scanner, a microphone, a touchscreen device, variations or combinations of one or more of the same, and/or any other I/O device.

The communication interface 522 broadly represents any type or form of communication device or adapter capable of facilitating communication between the example computing system 510 and one or more additional devices. For example, in certain embodiments, the communication interface 522 may facilitate communication between the computing system 510 and a private or public network including additional computing systems. Examples of the communication interface 522 include, without limitation, a wired network interface (such as a network interface card), a wireless network interface (such as a wireless network interface card), a modem, and any other suitable interface. In at least one example, the communication interface 522 may provide a direct connection to a remote server via a direct link to a network, such as the Internet. The communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, the communication interface 522 may also represent a host adapter configured to facilitate communication between the computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. The communication interface 522 may also allow the computing system 510 to engage in distributed or remote computing. For example, the communication interface 522 may receive instructions from a remote device or send instructions to a remote device for execution.

In some examples, the system memory 516 may store and/or load a network communication program 538 for execution by the processor 514. In one example, the network communication program 538 may include and/or represent software that enables the computing system 510 to establish a network connection 542 with another computing system (not illustrated in FIG. 5) and/or communicate with the other computing system by way of the communication interface 522. In this example, the network communication program 538 may direct the flow of outgoing traffic that is sent to the other computing system via the network connection 542. Additionally, or alternatively, the network communication program 538 may direct the processing of incoming traffic that is received from the other computing system via the network connection 542 in connection with the processor 514.

Although not illustrated in this way in FIG. 5, the network communication program 538 may alternatively be stored and/or loaded in the communication interface 522. For example, the network communication program 538 may include and/or represent at least a portion of software and/or firmware that is executed by a processor and/or Application Specific Integrated Circuit (ASIC) incorporated in the communication interface 522.

As illustrated in FIG. 5, the example computing system 510 may also include a primary storage device 532 and a backup storage device 533 coupled to the communication infrastructure 512 via a storage interface 534. The storage devices 532 and 533 generally represent any type or form of storage device or medium capable of storing data and/or other computer-readable instructions. For example, the storage devices 532 and 533 may be a magnetic disk drive (e.g., a so-called hard drive), a solid state drive, a floppy disk drive, a magnetic tape drive, an optical disk drive, a flash drive, or the like. The storage interface 534 generally represents any type or form of interface or device for transferring data between the storage devices 532 and 533 and other components of the computing system 510. In one example, the data storage 120 from FIG. 1 may be stored and/or loaded in the primary storage device 532.

In certain embodiments, the storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. The storage devices 532 and 533 may also include other similar structures or devices for allowing computer software, data, or other computer-readable instructions to be loaded into the computing system 510. For example, the storage devices 532 and 533 may be configured to read and write software, data, or other computer-readable information. The storage devices 532 and 533 may also be a part of the computing system 510 or may be a separate device accessed through other interface systems.

Many other devices or subsystems may be connected to the computing system 510. Conversely, all of the components and devices illustrated in FIG. 5 need not be present to practice the embodiments described and/or illustrated herein. The devices and subsystems referenced above may also be interconnected in different ways from that shown in FIG. 5. The computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into the computing system 510. All or a portion of the computer program stored on the computer-readable medium may then be stored in the system memory 516 and/or various portions of the storage devices 532 and 533. When executed by the processor 514, a computer program loaded into the computing system 510 may cause the processor 514 to perform and/or be a means for performing the functions of one or more of the example embodiments described and/or illustrated herein. Additionally, or alternatively, one or more of the example embodiments described and/or illustrated herein may be implemented in firmware and/or hardware. For example, the computing system 510 may be configured as an Application Specific Integrated Circuit (ASIC) adapted to implement one or more of the example embodiments disclosed herein.

Figure 6:
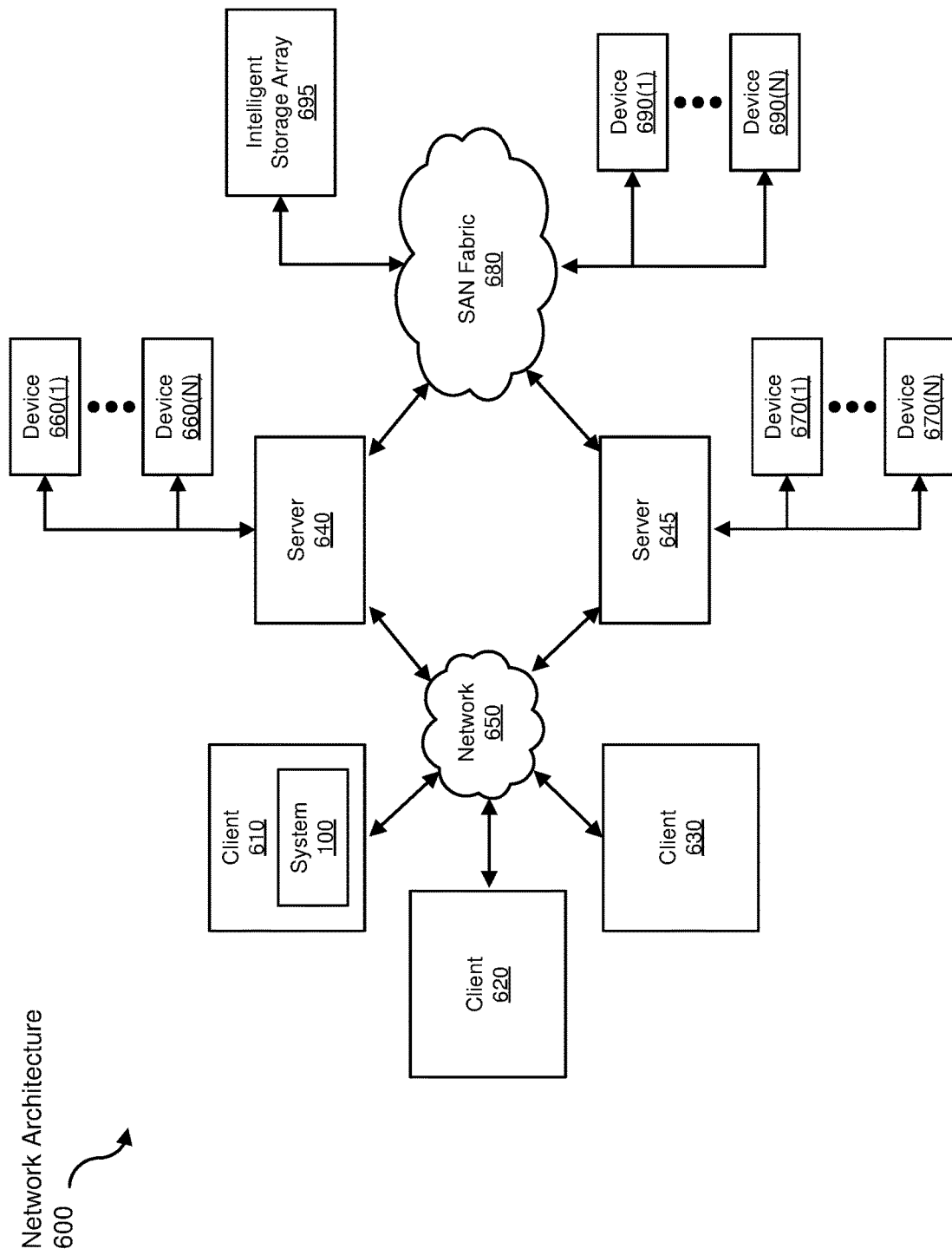
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of the network architecture 600 may perform and/or be a means for performing, either alone or in combination with other elements, one or more of the steps disclosed herein (such as one or more of the steps illustrated in FIG. 3). All or a portion of the network architecture 600 may also be used to perform and/or be a means for performing other steps and features set forth in the present disclosure.

The client systems 610, 620, and 630 generally represent any type or form of computing device or system, such as the example computing system 510 in FIG. 5. Similarly, the servers 640 and 645 generally represent computing devices or systems, such as application servers or database servers, configured to provide various database services and/or run certain software applications. The network 650 generally represents any telecommunication or computer network including, for example, an intranet, a WAN, a LAN, a PAN, or the Internet. In one example, the client systems 610, 620, and/or 630 and/or servers 640 and/or 645 may include all or a portion of the system 100 from FIG. 1.

As illustrated in FIG. 6, one or more storage devices 660(1)-(N) may be directly attached to the server 640. Similarly, the one or more storage devices 670(1)-(N) may be directly attached to the server 645. The storage devices 660(1)-(N) and the storage devices 670(1)-(N) generally represent any type or form of storage device or medium capable of storing data and/or other computer-readable instructions. In certain embodiments, the storage devices 660(1)-(N) and the storage devices 670(1)-(N) may represent Network-Attached Storage (NAS) devices configured to communicate with the servers 640 and 645 using various protocols, such as Network File System (NFS), Server Message Block (SMB), or Common Internet File System (CIFS).

The servers 640 and 645 may also be connected to a Storage Area Network (SAN) fabric 680. The SAN fabric 680 generally represents any type or form of computer network or architecture capable of facilitating communication between a plurality of storage devices. The SAN fabric 680 may facilitate communication between the servers 640 and 645 and a plurality of the storage devices 690(1)-(N) and/or an intelligent storage array 695. The SAN fabric 680 may also facilitate, via the network 650 and the servers 640 and 645, communication between the client systems 610, 620, and 630 and the storage devices 690(1)-(N) and/or the intelligent storage array 695 in such a manner that the devices 690(1)-(N) and the array 695 appear as locally attached devices to the client systems 610, 620, and 630. As with the storage devices 660(1)-(N) and the storage devices 670(1)-(N), the storage devices 690(1)-(N) and the intelligent storage array 695 generally represent any type or form of storage device or medium capable of storing data and/or other computer-readable instructions.

In certain embodiments, and with reference to the example computing system 510 of FIG. 5, a communication interface, such as the communication interface 522 in FIG. 5, may be used to provide connectivity between each client system 610, 620, and 630 and the network 650. The client systems 610, 620, and 630 may be able to access information on the server 640 or 645 using, for example, a web browser or other client software. Such software may allow the client systems 610, 620, and 630 to access data hosted by the server 640, the server 645, the storage devices 660(1)-(N), the storage devices 670(1)-(N), the storage devices 690(1)-(N), or the intelligent storage array 695. Although FIG. 6 depicts the use of a network (such as the Internet) for exchanging data, the embodiments described and/or illustrated herein are not limited to the Internet or any particular network-based environment.

In at least one example, all or a portion of one or more of the example embodiments disclosed herein may be encoded as a computer program and loaded onto and executed by the server 640, the server 645, the storage devices 660(1)-(N), the storage devices 670(1)-(N), the storage devices 690(1)-(N), the intelligent storage array 695, or any combination thereof. All or a portion of one or more of the example embodiments disclosed herein may also be encoded as a computer program, stored in the server 640, run by the server 645, and distributed to the client systems 610, 620, and 630 over the network 650.

As detailed above, the computing system 510 and/or one or more components of the network architecture 600 may perform and/or be a means for performing, either alone or in combination with other elements, one or more steps of an example method for managing endpoint security states using passive data integrity attestations.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of the example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of the example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of the example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally, or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of the example system 100 in FIG. 1 may represent portions of a mobile computing environment. The mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, the mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of the example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of the example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of the example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing endpoint security states using passive data integrity attestations, at least a portion of the method being performed by a computing device comprising at least one processor, the method comprising:
   receiving, by a computing device, passively collected network data from an endpoint device of a computing environment;
   determining a security state of the endpoint device using the passively collected network data from the endpoint device;
   determining that the security state of the endpoint device is below a threshold; and
   in response to determining that the security state of the endpoint device is below the threshold, performing a security action to protect the computing environment against malicious actions, wherein the security action comprises:
      updating the endpoint device to a reduced trust level; and
      displaying a notification to a user of the endpoint device with the reduced trust level.

2. The computer-implemented method of claim 1, further comprising at least one of:
   authorizing access to resources associated with the reduced trust level; or
   blocking access to resources of the computing environment.

3. The computer-implemented method of claim 1, wherein the reduced trust level is associated with the user of the endpoint device and the method further comprises:
   identifying computing devices associated with the user; and
   associating the reduced trust level with the computing devices of the user.

4. The computer-implemented method of claim 1, wherein the passively collected network data from the endpoint device comprises at least one of:
   an encryption level of a network connection;
   an indication that personally identifying information has been transmitted in plaintext; or
   metadata associated with a network connection of the endpoint device.

5. The computer-implemented method of claim 1, wherein the passively collected network data from the endpoint device is collected in a user session of the endpoint device.

6. The computer-implemented method of claim 1, wherein the passively collected network data from the endpoint device is collected using a network filter.

7. A system for managing endpoint security states using passive data integrity attestations, the system comprising:
   at least one physical processor;
   physical memory comprising computer-executable instructions that, when executed by the physical processor, cause the physical processor to:
      receive passively collected network data from an endpoint device of a computing environment;
      determine a security state of the endpoint device using the passively collected network data from the endpoint device;
      determine that the security state of the endpoint device is below a threshold; and
      in response to determining that the security state of the endpoint device is below the threshold, perform a security action to protect the computing environment against malicious actions, wherein the security action comprises:
         updating the endpoint device to a reduced trust level; and
         displaying a notification to a user of the endpoint device with the reduced trust level.

8. The system of claim 7, wherein the computer-executable instructions further cause the physical processor to at least one of:
   authorize access to resources associated with the reduced trust level; or
   block access to resources of the computing environment.

9. The system of claim 7, wherein the reduced trust level is associated with the user of the endpoint device and wherein the computer-executable instructions further cause the physical processor to:
   identify computing devices associated with the user; and
   associate the reduced trust level with the computing devices of the user.

10. The system of claim 7, wherein the passively collected network data from the endpoint device comprises at least one of:
   an encryption level of a network connection;
   an indication that personally identifying information has been transmitted in plaintext; or
   metadata associated with a network connection of the endpoint device.

11. The system of claim 7, wherein the passively collected network data from the endpoint device is collected in a user session of the endpoint device.

12. The system of claim 7, wherein the passively collected network data from the endpoint device is collected using a network filter.

13. A non-transitory computer-readable medium comprising one or more computer-executable instructions that, when executed by at least one processor of a computing device, cause the computing device to:
   receiving, by a computing device, passively collected network data from an endpoint device of a computing environment;

determining a security state of the endpoint device using the passively collected network data from the endpoint device;

determining that the security state of the endpoint device is below a threshold; and in response to determining that the security state of the endpoint device is below the threshold, performing a security action to protect the computing environment against malicious actions, wherein the security action comprises:

updating the endpoint device to a reduced trust level; and displaying a notification to a user of the endpoint device with the reduced trust level.

14. The non-transitory computer-readable medium of claim 13, wherein the one or more computer-executable instructions further cause the computing device to at least one of:

authorize access to resources associated with the reduced trust level; or block access to resources of the computing environment.

15. The non-transitory computer-readable medium of claim 13, wherein the reduced trust level is associated with the user of the endpoint device and wherein the one or more computer-executable instructions further cause the computing device to:

identify computing devices associated with the user; and associate the reduced trust level with the computing devices of the user.

16. The non-transitory computer-readable medium of claim 13, wherein the passively collected network data from the endpoint device comprises at least one of:

an encryption level of a network connection;

an indication that personally identifying information has been transmitted in plaintext; or metadata associated with a network connection of the endpoint device.

17. The non-transitory computer-readable medium of claim 13, wherein the passively collected network data from the endpoint device is collected in a user session of the endpoint device.

18. The computer-implemented method of claim 1, wherein the passively collected network data is associated with a trace route from the endpoint device to a target resource.

19. The system of claim 7, wherein the passively collected network data, wherein the passively collected network data is associated with a trace route from the endpoint device to a target resource.

20. The non-transitory computer-readable medium of claim 13, wherein the passively collected network data is associated with a trace route from the endpoint device to a target resource.

* * * * *